Figure 1:
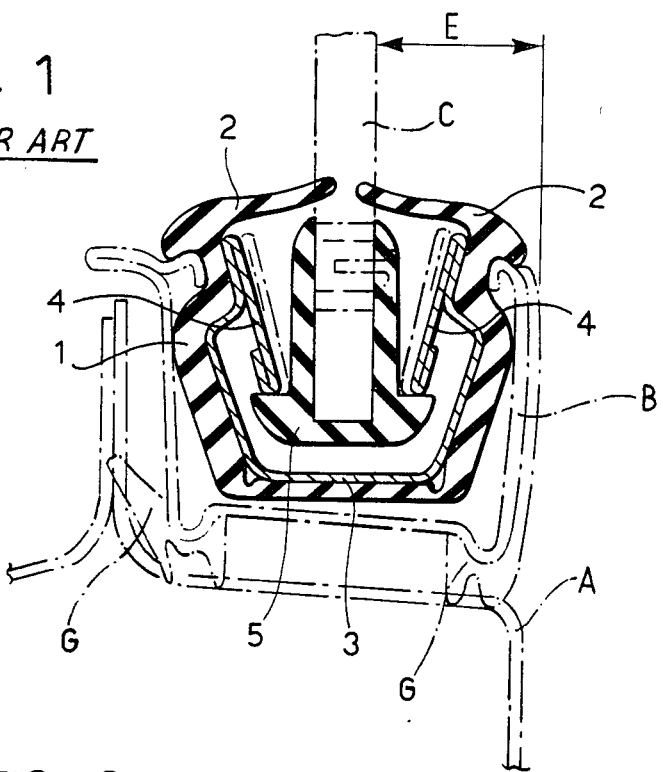

United States Patent [19]

Barbero

[11] Patent Number: 4,553,354
[45] Date of Patent: Nov. 19, 1985

[54] GUIDE DEVICE FOR SLIDING WINDOWS OF MOTOR VEHICLES AND A METHOD FOR ITS MANUFACTURE

[75] Inventor: Mario Barbero, Turin, Italy
[73] Assignee: Fiat Auto S.p.A., Turin, Italy
[21] Appl. No.: 614,100
[22] Filed: May 25, 1984
[30] Foreign Application Priority Data
 May 26, 1983 [IT] Italy ............................... 67588 A/83
[51] Int. Cl.$^4$ .......................... E05D 15/16; E06B 7/16
[52] U.S. Cl. ......................................... 49/431; 49/441
[58] Field of Search ................. 49/441, 440, 488, 489, 49/483, 431

[56] References Cited

U.S. PATENT DOCUMENTS

| | | | |
|---|---|---|---|
| 3,068,136 | 12/1962 | Reid | 49/440 X |
| 3,131,439 | 5/1964 | Wilfert | 49/440 X |
| 3,401,075 | 9/1968 | Jackson | 49/441 X |
| 3,466,802 | 9/1969 | Doveinis et al. | 49/440 X |

FOREIGN PATENT DOCUMENTS 1509976 11/1969 Fed. Rep. of Germany ........ 49/441

*Primary Examiner*—Philip C. Kannan
*Attorney, Agent, or Firm*—Sughrue, Mion, Zinn, Macpeak and Seas

[57] ABSTRACT

A guide device for sliding windows of motor vehicles includes a channel-shaped weather strip fixed to the body of the motor vehicle along one side of the window and provided with a rigid core and a pair of converging lips which cooperate with the opposite surface of the glass. A runner is fixed to the edge of glass and cooperates slidingly with the rigid core of the weather strip. The rigid core is at least partially embedded in the body of the weather strip and has first and second limbs extending respectively in correspondence with the base wall of the weather strip and that side wall of the weather strip facing inwardly of the motor vehicle. The second limb also has a bent appendage the end of which lies approximately in the median longitudinal plane of the weather strip. The zone of convergence of the lips of the weather strip lies in an intermediate plane between the longitudinal median plane and the side wall of the weather strip facing outwardly of the motor vehicle. The runner is L-shaped with one arm connected to the glass and the other arm in sliding contact with the surface of the profiled appendage of the second limb of the core facing the first limb of the core. The arrangement is such that the arm of the runner connected to glass cooperates slidingly with the side wall of the weather strip facing outwardly of the vehicle.

2 Claims, 3 Drawing Figures

GUIDE DEVICE FOR SLIDING WINDOWS OF MOTOR VEHICLES AND A METHOD FOR ITS MANUFACTURE

The present invention relates to guide devices for sliding windows of motor vehicles, and is concerned particularly with a device comprising a channel-shaped weather strip fixed to the motor vehicle body along one side of the window and provided with a rigid core and a pair of converging lips which cooperate with the opposite surfaces of the glass, and a runner fixed to the edge of the glass and cooperating slidingly with the rigid core of the weather strip.

Guide devices of the type specified above are those normally fitted to motor vehicles in production at present. In these devices, the runner has approximately a T-section and the rigid core of the channel-shaped weather strip has a symmetrical transverse profile with two side walls the free ends of which are bent inwardly of the channel. These free ends are resilient and allow the snap-insertion of the head part of the runner in the weather strip.

This solution has several important disadvantages. In the first place, the weather strip is normally fixed to one of the sides of the window so that the side wall facing outwardly of the motor vehicle is substantially flush with the parts of the vehicle body around the window. The structure of the weather strip and its size are such that the outer surface of the glass is inset ("sunken") relative to the parts of the body around the window. This arrangement has an adverse effect on the aerodynamics of the vehicle and gives rise to turbulence and noise during travel.

Furthermore, the head of the runner, which is of metal or rigid plastics material, is between the bent edges and the side walls of the core, which is normally of metal, of the weather strip. Even oscillation of the glass, such as that produced by vibrations during movement, gives rise to noise; this disadvantage is felt even more considerably in devices associated with the door windows of the motor vehicle during closure of these doors.

The object of the present invention is to provide a guide device of the type specified above, which does not have the aforementioned disadvantages and may be manufactured and installed simply and cheaply.

This object is achieved according to the present invention by means of a device of the type specified above, characterised in that:

the rigid core is at least partially embedded in the body of the weather strip and has a first limb and a second limb which extend in correspondence with the base wall of the weather strip and that side wall of the weather strip facing inwardly of the motor vehicle, respectively, the second limb also having an appendage which faces inwardly of the weather strip and has its free end aligned approximately with the longitudinal median plane of the weather strip itself, the zone convergence of the lips of the weather strip lies in an intermediate plane between the longitudinal median plane and that side wall of the weather strip facing outwardly of the motor vehicle, and the runner is L-shaped and includes a first arm connected to the glass and a second arm which cooperates slidingly with the surface of the appendage facing the first limb of the rigid core, the arrangment being such that the first arm of the runner cooperates slidingly with the side wall of the weather strip facing outwardly of the vehicle.

By virtue of this characteristic the disadvantages typical of the prior art devices are eliminated.

In the first place, the outer surface of the glass is considerably closer to a position of alignment with the parts of the body around the window, thus improving the aerodynamic characteristics and quietness of the vehicle.

Noises due to oscillation of the glass are also eliminated; in fact, the runner cooperates with one of the side walls of the weather strip, which is normally of rubber, and acts a damping element.

These is also a reduction in the overall weight of the weather strip as a result of a reduction in the size of the core, which is normally of metal. Finally, the assembly of the weather strip is simplified since it is no longer necessary to introduce the metal core into the weather strip itself.

This invention also relates to a method for the manufacture of a guide device for windows having the innovative characteristics specified above. This method is characterised in that it includes the steps of:

forming a shaped strip element of plastically deformable rigid material, the profile of which reproduces a development of the rigid core of the weather strip in the condition in which the limbs of the core are coplanar with each other, incorporating the plastically deformable element at least partially in a strip-shaped rubber body which is substantially C-shaped and includes a flat central portion defining, in development, the base wall and the side walls of the weather strip and two shaped end edges oriented approximately perpendicular to the central flat portion and each reproducing the profile of one of the lips of the weather strip, and plastically deforming the rubber body and the strip element incorporated therein so as to bend the flat central portion into a U-shape and bring the free ends of the shaped end edges into substantially a mating position.

Figure 2:
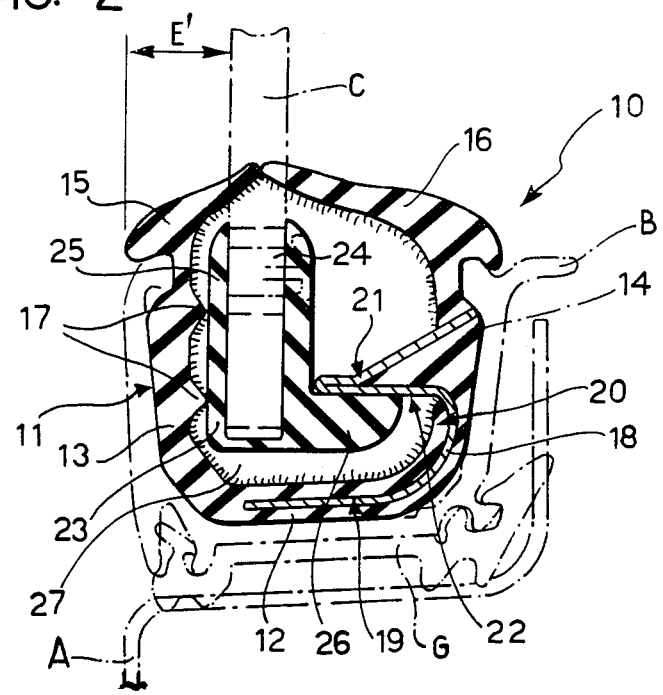
Figure 3:
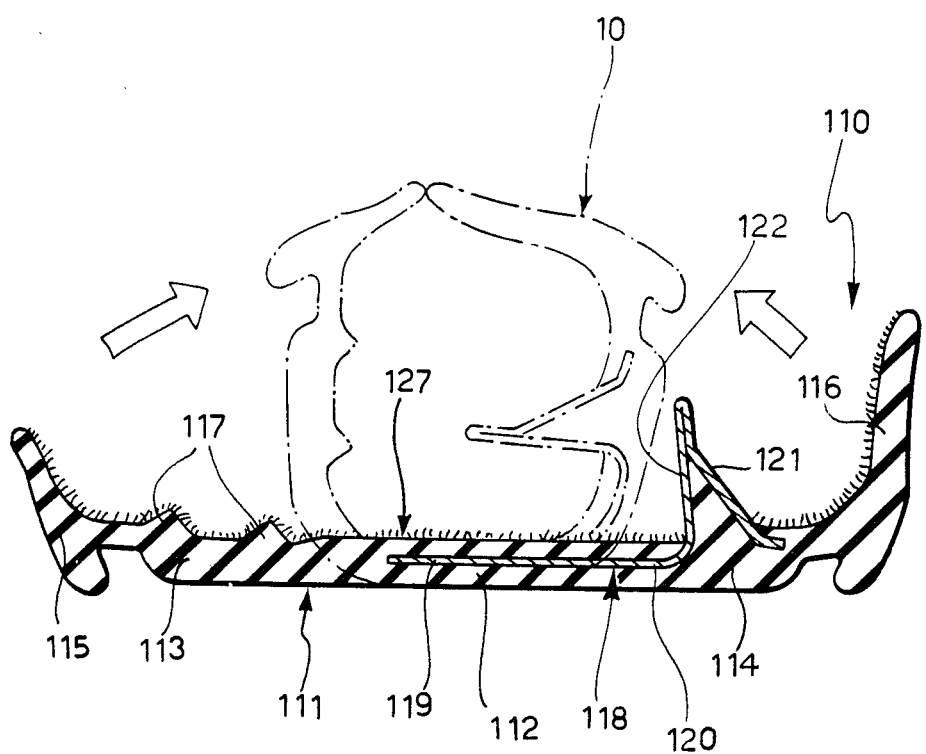

The invention will now be described, purely by way of non-limiting example, with reference to the appended drawings, in which:

FIG. 1 shows a cross-section of a guide device for sliding windows of motor vehicles, according to the prior art, FIG. 2 is a sectional view substantially similar to FIG. 1, illustrating a device according to the present invention, and FIG. 3 illustrates schematically the method of manufacture of the guide device of FIG. 2.

In FIGS. 1 and 2, a part of the body of a motor vehicle (not illustrated in its entirety) defining one of the vertical sides of one of the windows of the motor vehicle is indicated A.

FIGS. 1 and 2 correspond approximately to a section taken in a horizontal plane in a position intermediate the lower edge and the upper edge of the window itself.

The part of the body indicated A has a recess within which is assembled, normally with the interposition of metal clips G, a metal U-section insert (channel) B the sides of which are disposed in positions embracing one of the vertical edges of the glass C.

Under the action of a raising device (not illustrated in the drawings) the glass C may be made to slide in a plane approximately perpendicular to the section planes of FIGS. 1 and 2 between a lowered position and a raised position in which the glass C closes the window.

In FIG. 1, which relates to a guide device of the prior art, a rubber channel-shaped weather strip, indicated 1, is inserted in the channel B.

The weather strip 1 has a pair of converging lips 2 which extend from the upper ends of the side walls of the weather strip 1 and cooperate with the opposite surfaces of the glass C to ensure sealing between the glass and the parts A of the body at the edges of the window.

Within the weather strip 1 is a rigid member (core) 3 with a profile which reproduces the internal profile of the weather strip 2.

The side walls of the member 3, which is of metal, have bent end portions 4 which project inwardly of the member 3 itself and are formed so as to be resiliently yieldable.

A T-shaped insert 5 is fixed to the upper end edge of the glass C, for example by screwing, but has a smaller length.

The insert 5, which is of a hard material such as metal, is intended to cooperate with the projections 4 of the member 3 to guide the glass C in its sliding movement between the lowered position and the closed position.

The weather strip 2, the member 3 and the runner 5 have a symmetrical structure. The glass C thus lies in a plane substantially coincident with the median plane of the channel B. The surface of the glass C facing outwardly of the motor vehicle is thus recessed (sunken) relative to the surrounding outer surface of the bodywork defined by the part of the body around the window.

The amount of recessing of the outer surface of the glass C relative to the surrounding outer surface (E in FIG. 1) is typically of the order of 8–9 mm.

Any oscillations of the glass C in the channel B cause the runner 5 to knock against the bent projections 4 of the member 3, thereby generating noise.

In FIG. 2, a guide device according to the invention is generally indicated 10.

This device includes a rubber weather strip 11 fitted in the channel B.

The weather strip 11 can be seen to be constituted by a base wall 12, two side walls 13, 14 facing outwardly and inwardly of the vehicle respectively, and two converging lips 15, 16 which differ from each other. In particularly, the lip 15 is smaller than the lip 16 so that the zone of convergence of the two lips is in a position intermediate the longitudinal median plane of the weather strip 11 (and of the channel B) and the side wall 13 of the weather strip facing outwardly of the motor vehicle.

The same wall 13 has a pair of longitudinal projections 17 of approximately triangular profile on its surface facing inwardly of the weather strip; the function of the projections will be explained better below.

The reinforcing element (core) 18 of plastically deformable metal is embedded in the base wall 12 and the side wall 14 of the weather strip 11.

The core 18 has approximately an L-shaped cross-section which can be seen to comprise a first limb 19 embedded in the base wall 12 of the weather strip 11 and a second limb 20 embedded in the side wall 14 of the weather strip 11.

The limb 20 has a bent appendage 21 of approximately triangular section which projects inwardly of the weather strip 11 in such a way that the end of the appendage 21 lies approximately in the median plane of the weather strip 11 itself. The appendage 21 has a flat surface 22 facing the first limb 19 of the core 20 and parallel thereto.

A runner, generally indicated 23, is fixed by a screw 24 to the edge of the glass C close to the upper end of the edge.

The runner 23, which is of a wear-resistant material such as metal or hard plastics, has an L-shaped cross-section with a first arm 25 connected to the glass C and a second arm 26 extending into the space between the base wall 12 of the weather strip 11 and the appendage 21 of the second limb of the core 20.

The arm 26 of the runner 23, with the surface facing the glass C, bears on the flat surface 22 of the appendage 21. The core 20 thus guides the runner 23 in its vertical sliding movement within the weather strip 11 during the movement of the glass C.

The retention of the glass C in its vertical sliding plane is ensured by the free end of the appendage 21 and the triangular-section ribs 17 with which the outer wall 13 of the weather strip 11 is provided. As shown in FIG. 2, the dimensions of these parts are selected so as not to hold the glass C tightly. This avoids jamming while allowing the ribs 12 to effect a damping action on any oscillations or vibrations of the glass C. The absence of jamming during the vertical sliding movement of the glass C is also ensured by the presence of a coating 27, of the type generally termed flocking, on the inner surfaces of the walls of the weather strip 1.

By virtue of the asymmetric configuration of the weather strip 11, the core 20 and the runner 23, the distance (indicated E') between the outer surface of the glass C and the external line of the bodywork, defined by the parts A around the window, may be reduced to 5 mm or less, with a significant improvement in the aerodynamic and noise characteristics of the motor vehicle.

As is illustrated schematically in FIG. 3, the weather strip 11 is formed from a preformed member, generally indicated 110, comprising a deformable metal core portion 118 typically incorporated in a mass of rubber 111 by a co-extrusion process.

The profile of the elements indicated 111 and 118 in FIG. 3 reproduces in development the profile of the members indicated by the same references less 100 in FIG. 2.

Thus, the profiled rubber body 111 can be seen to comprise a substantially flat central portion P including three adjacent longitudinal sections 112, 113, 114 with profile which reproduce the profiles of the central wall 12 and the side walls 13, 14 of the weather strip 11. More particularly, on the section 113 are provided two triangular-sectioned longitudinal ribs 117 the profiles of which reproduce the profiles of the ribs 17 on the inner surface of the side wall 13 of the weather strip 11. Two shaped side walls (edges) of the body 111, indicated 115 and 116, extend approximately perpendicular to the central flat portion of the body 111 from the outer sides of the sections 113 and 114. The side edges 115 and 116 have different profiles from each other, reproducing respectively the profile of the lip 15 and the profile of the lip 16 of the weather strip 11.

In exactly the same way, the metal core 118 can be seen to comprise two limbs one of which, indicated 119, extends inwardly of the section 112 of the element 111 and the other of which, indicated 120, extends inwardly of the section 114 of the element 111.

The profile of each of the limbs 119 and 120 reproduces the profile of the corresponding limbs 19 and 20 of the core 18 illustrated in FIG. 2.

More particularly, the limb indicated 120 has a triangular-sectioned appendage 121 with a flat surface 122 facing inwardly of the element 110.

The element 110 thus reproduces the structure of the guide device 10 in an "open" condition.

The arrangement is such that, after a flocking treatment intended to form a layer 127 having low sliding friction characteristics on the inner surface of the element 110, the element 110 may be fed to an ordinary shaping station (for example, a roller shaping station) to give it its final "closed" configuration for assembly, in which the free ends of the shaped edges 115 and 116 are substantially in mating positions. The shaping of the element 110 is achieved, as indicated schematically by the arrows in FIG. 3, by bending the central flat portion of the body 111 into a U-shape along the dividing line between the section 112 and the section 113 and along the dividing line between the section 112 and the section 114. The bending of the central part of the body 111 into a U involves the simultaneous bending of the core 118 into an L-shape along the dividing line between the limb 119 and the limb 120 of the core 118. The element 110 thus shaped constitutes the channel shaped guide body for insertion in the channel B in the arrangement illustrated in FIG. 2.

Naturally, while the principal of the invention remains the same, the details of construction and forms of embodiment may vary widely from that described and illustrated, without therby departing from the scope of the present invention.

I claim:

1. A guide device for sliding windows of motor vehicles, comprising a channel-shaped weather strip fixed to the motor vehicle body along one side of the window and having two side walls and a base wall, a rigid core, and a pair of converging lips which cooperate with opposite surfaces of the glass, and a runner fixed to an edge of the glass and cooperating slidingly with the rigid core of said weather strip, wherein the improvement consists in:

said rigid core being at least partially embedded in the body of said weather strip and having first and second limbs which extend respectively in correspondence with the base wall of said weather strip and that side wall of the weather strip facing inwardly of the motor vehicle;

said second limb having an appendage which faces inwardly of the weather strip and as its free end aligned approximately with the longitudinal median plane of the weather strip;

said lips of the weather strip converging at zone which lies in a plane intermediate the said longitudinal median plane and that side wall of the weather strip facing outwardly of the motor vehicle, and said runner being L-shaped and including a first arm connected to the glass and a second arm cooperating slidingly with the surface of said appendage facing said first limb of the core, whereby the first arm of said runner cooperates slidingly with the side wall of the weather strip facing outwardly of the vehicle.

2. A device as defined in claim 1, wherein internal longitudinal ribs are formed on the side wall of said weather strip facing outwardly of the vehicle, said ribs defining sliding guides for said runner.

* * * * *